May 28, 1929.  C. L. PREDDY  1,714,922

SAFETY BRAKE HEAD FOR RAILWAY CARS

Filed July 8, 1926

Inventor
C. L. Preddy

Patented May 28, 1929.

1,714,922

UNITED STATES PATENT OFFICE.

CHARLES L. PREDDY, OF MEXIA, TEXAS.

SAFETY BRAKE HEAD FOR RAILWAY CARS.

Application filed July 8, 1926. Serial No. 121,196.

My invention relates to improvements in a locking device on brake heads on all railway cars to prevent and eliminate the falling or dropping of the brake beam in case the brake shoe key is lost or destroyed, or in case the safety chains attached to the brake beam should become broken or disengaged, and thereby reduce to a minimum the dangers and damages occasioned by reason of falling brake beams.

Figure 1:
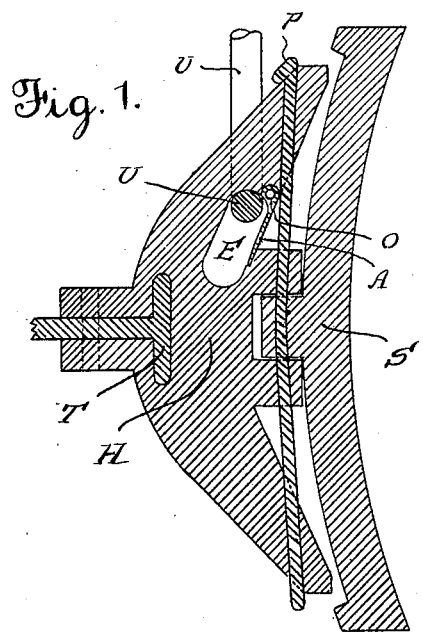
Figure 2:
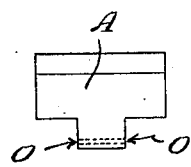
Figure 3:

I attain these objects by the mechanism illustrated in the accompanying drawing as follows, to-wit:

Figure 1 is a vertical longitudinal section through the brake head embodying the features of my invention, Fig. 2 is a detail plan view of the locking device, Fig. 3 is an end view thereof.

Figure 1 shows the brake head and beam in general use on all railway cars; the brake head is designated by the letter H; the brake shoe is represented by the letter S; the brake shoe key is represented by the letter P; the brake hanger is represented by the letter U; the hanger slot is represented by the letter E; the safety locking device is represented by the letter A; and the brake beam is represented by the letter T. The safety locking device is formed with a bore O through which a pin extends to pivotally connect the device to the brake head. The safety locking device A is hinged as at O in the upper end of the slot and is sufficiently long to abut the inner surface of the slot adjacent the lower end of the entrance thereto.

I carry out the feature of my invention by installing the locking device A on the brake head H on the brake heads and beams on all railway cars now in use. The locking device is installed by connecting same with rivet through the brake head H permitting the brake hanger U to be placed in the hanger slot E when the locking device shown by Figure 2 will naturally fall into place thereby holding the brake hanger securely in hanger slot, and the brake hanger cannot by any possible means be removed from the hanger slot, except by hand, in case the brake shoe key P is lost or destroyed or the safety chains attached to the brake beam shown by T should become broken or disengaged, thus absolutely preventing the falling of the brake beam.

What I claim as my invention, and desire to secure by Letters Patent is:

In combination, a brake head having a slot therein, a hanger extending into the slot, and a locking device hinged directly at the upper end of the entrance to the slot and abutting the inner surface of the slot adjacent the lower end of the entrance and free to swing only inwardly of the slot and therefore preventing the accidental displacement of the hanger.

In testimony whereof I have signed my name to this specification on this the 12th day of June, A. D. 1926.

C. L. PREDDY.